Dec. 29, 1964 F. LAZAN, JR 3,163,385
MULTIPURPOSE CLIP FOR KITCHEN UTENSILS
Filed May 24, 1962 2 Sheets-Sheet 1
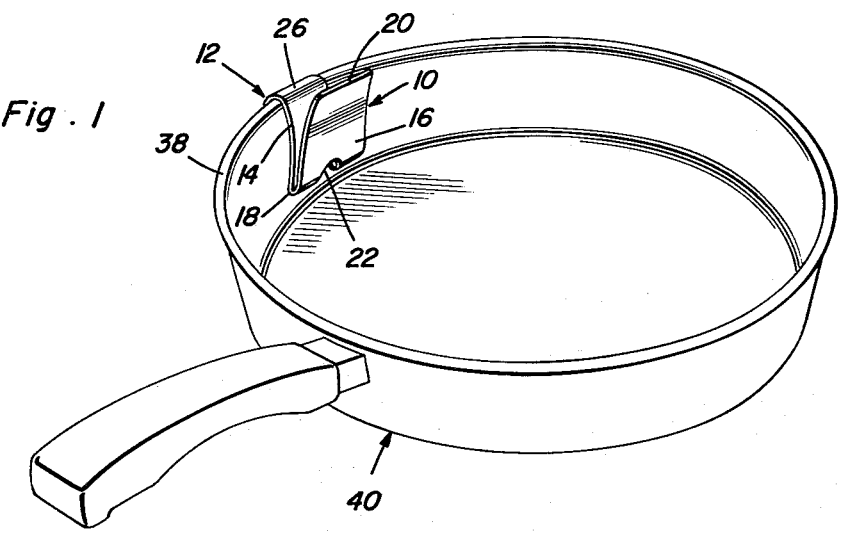
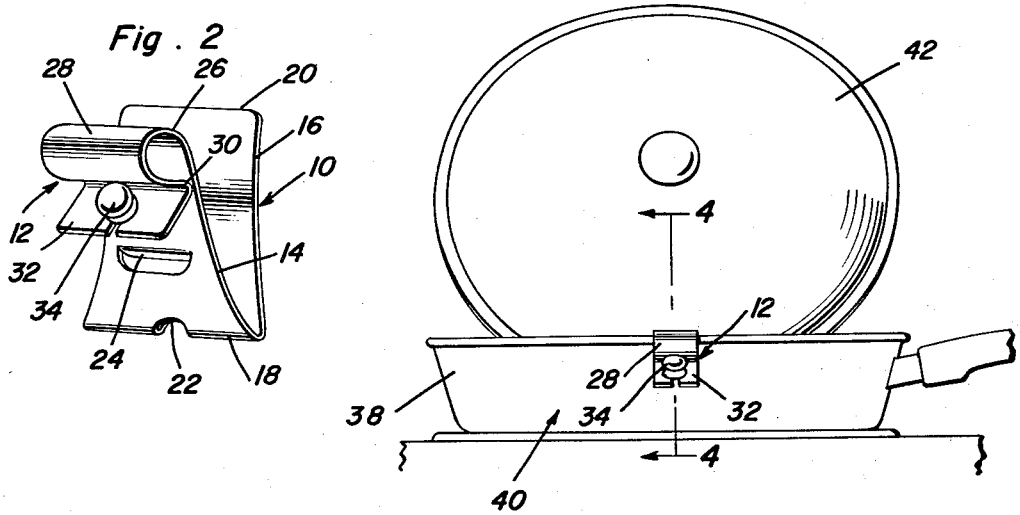
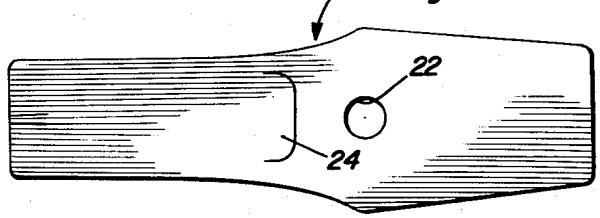
Frank Lazan, Jr.
INVENTORS.

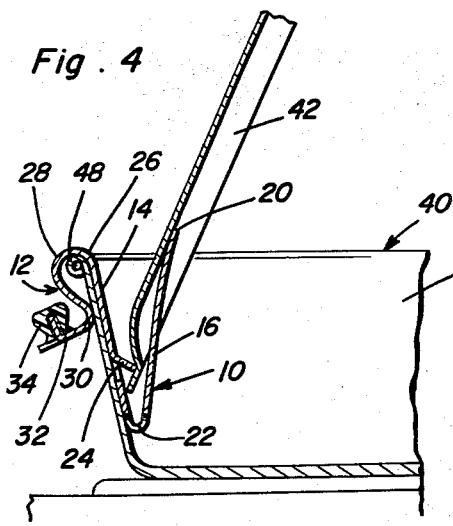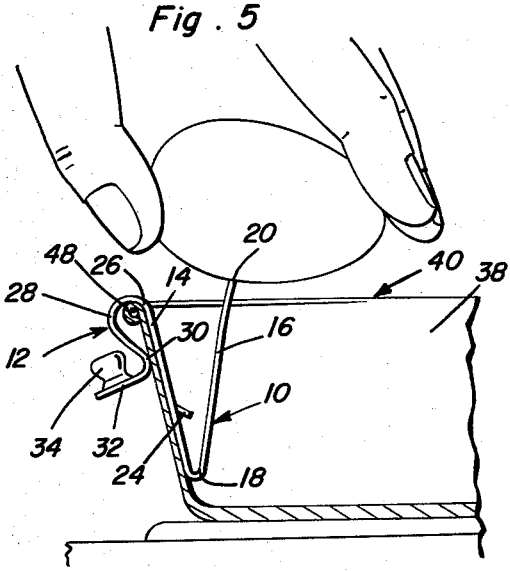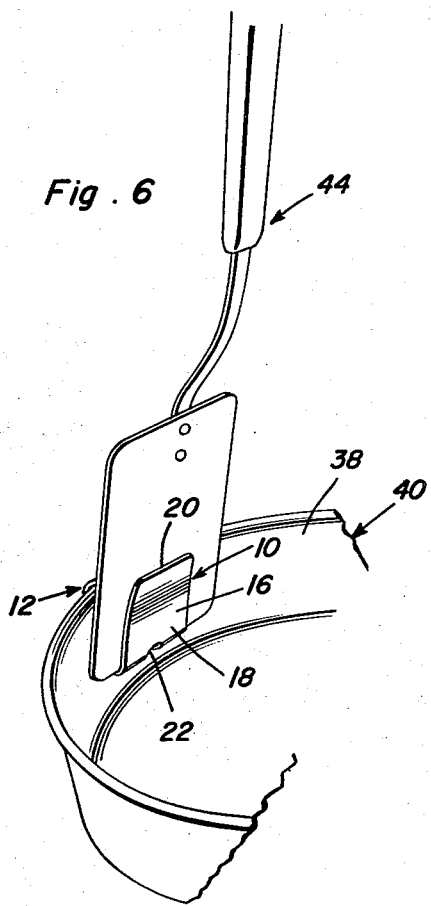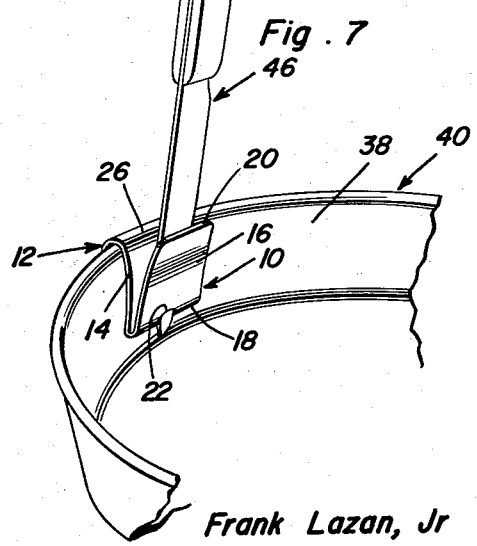
Frank Lazan, Jr
INVENTOR.

United States Patent Office 3,163,385
Patented Dec. 29, 1964

3,163,385
MULTIPURPOSE CLIP FOR KITCHEN
UTENSILS
Frank Lazan, Jr., 2836 Herkimer, Baltimore, Md., assignor of one-third each to Edmund Rosiak, Morgantown, W. Va., and John L. Johnson, Baltimore, Md.
Filed May 24, 1962, Ser. No. 197,369
6 Claims. (Cl. 248—37.6)

This invention relates to a support and holder for kitchen and table articles and implements and has to do with a novel and improved multipurpose clip which is adapted to be removably mounted on the rim or wall of a pot, pan, skillet or the like and which serves to accommodatingly support and securely hold implements such as, for example, forks, spoons, knives, spatulas, food turners and the like.

A general objective is to structurally, functionally and in other ways improve upon similarly constructed and performing prior art holders and, having done so, to advance the art.

Briefly, the clip is such in design and construction that it may be satisfactorily and economically made from aluminum, stainless steel and other suitable non-rusting materials possessed of the desired resilient properties. It is designed and appropriately adapted for readily accessible use. It is characterized by means which is constructed to retentively but removably support lids and also implements such as forks, spoons, food turners and the like over the receptacle portion of the utensil and clip attaching and retaining means carried by the first-named means and releasably connectible to the upper part of the rim of the utensil. The second-named means is resilient and functions to snap itself into position and retain the clip in its given position. The component portions of the respective means having their major portions disposable below the level of the top edge of the utensil's rim and minimal portions only in a plane above said edge so as not to interfere with proper placement and retention of utensil covers and lids.

As will be hereinafter set forth with gerater particularity the first-named means embodies a component portion which is spaced inwardly from the outer surface of the utensil rim or wall. This is such in construction that it lends itself to use as an egg breaker. In addition, this first-named means is provided with an orifice which constitutes a drainage port.

It is another object of the invention to provide an adaptation as briefly revealed above and wherein the second-named means is equipped with an accessible finger-gripping knob which can be readily caught hold of in a manner to bodily lift and detach the clip from the aforementioned rim.

More specifically it is an object of the invention to provide a holder which is substantially V-shaped in edge elevation and embodies inner and outer upwardly diverging legs. The outer leg is adapted to contact and rest against the inner surface of the skillet or other utensil wall. The inner leg has an upper free edge portion which constitutes the aforementioned egg breaker. The upper end of the outer leg is provided with a self-retained resilient clasp to releasably hook over the upper edge of the wall in a manner that the bill at the free end portion thereof may bear yieldingly against the outer surface of the wall. This bill portion is preferably rounded and is joined with an outstanding extension or flange which flange is constructed to accommodatingly support a suitably attached finger-gripping knob.

Then, too, a tongue or lug is struck out from the median portion of the outer leg and this lug projects into the space between the two legs and terminates short of the inner leg and constitutes a simple detent which assists in retaining and supporting the part of the implement which is interposed between the legs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective showing a frying pan or skillet and illustrating the novel multipurpose attachment-type clip and illustrating how it is constructed and applied for use;

FIGURE 2 is a view in perspective of the clip by itself, the view being on a larger scale to facilitate an understanding of the component parts and their association and arrangement;

FIGURE 3 is a view in elevation the purpose of which is to show the position of a clasp and knob and, in addition, how a lid or cover is supported above and within the limits of the receptacle portion of the skillet;

FIGURE 4 is a section on an enlarged scale taken on plane of the vertical line 4—4 of FIGURE 3 looking in the direction of the arrows;

FIGURE 5 is a view similar to FIGURE 4 with the clip appearing in edge elevation and illustrating how the upper end of the inner leg is used as an egg breaker;

FIGURE 6 is a view showing a fragmentary portion of a pan or other equivalent utensil and wherein the multipurpose clip is shown supporting a pancake turner;

FIGURE 7 is a view in perspective similar to FIGURE 6 and the purpose of which is to show the versatile nature of the clip and how, for example, the blade of a knife may be supported and held; and FIGURE 8 is a plan view showing the shape of the blank of metal or other material from which the clip, not including the knob, is fashioned.

With reference first to FIGURE 2 it will be seen that the over-all clip is fashioned from a single blank of bendable sheet material wherein the component portions are possessed of the desired strength and resiliency to accomplish the end results desired. The aforementioned first-named means which is located within the confines of the utensil is denoted generally by the numeral 10 and the companion second-named means which is primarily disposed on the exterior of the utensil is denoted generally by the numeral 12. More explicitly the means 10 comprises the clip proper which, it will be noted, is substantially V-shaped in edge elevation, the same embodying an outer leg 14, an opposed inner leg 16 and a rounded bight or connecting portion 18 which latter may also be described as a crotch. These legs are sufficiently broad to achieve the end results desired. The upper end portion of the leg 16 may be straight or, if preferred flared slightly inward. The extreme upper edge 20 is suitable for use as an egg breaker as illustrated in FIGURE 5. The median part of the bend or bight portion 18 is provided with an orifice 22 of appropriate size which constitutes a drainage port. The median portion of the leg 14 has an elongated tongue 24 struck out therefrom, the tongue being bent inwardly so that it projects into the space between the two legs 14 and 16 and which assumes a position as best shown in FIGS. 4 and 5 to function as a catch or detent. The upper end portion 26 of the outer leg is integrally joined to the attaching and retaining clasp 12. It will be noted that the body portion of the clasp is fashioned into a hook 28 which may be suitably positioned in the manner shown, for instance, in FIGS. 4 and 5. The lower end of the hook is fashioned into a return bend 30 which is convexly rounded and which is designed and adapted to clamp itself against the exterior surface of the utensil wall also as best shown in FIGS. 4 and 5. The terminal portion beyond the bend 30 provides an extension which is here conveniently described as a flange 32 and which is oblique angled and slants outwardly and downwardly. This flange is suitably constructed to accommodatingly support a finger gripping knob 34 which, it will be noted, is on the upper side of the flange and disposed outwardly of the rounded crest of the hook-like body portion 28. Manifestly, the material used will be possessed of the desired resilient and retentive properties needed so that the clasp 12 constitutes a snap-on type retainer. However, by simply catching hold of the knob 34 this clasp may be sprung open and the clip, as an entity, readily lifted from its usable position.

The novel multipurpose clip herein shown and described may be economically fashioned from a blank of suitable metal designated generally by the numeral 36 in FIGURE 8. This shape permits bending of the blank into the component parts 10 and 12 already described. The drain hole 22 is provided when the blank is struck out as is the bendable tongue 24 which constitutes the aforementioned detent. Otherwise it appears to be unnecessary to dwell on this aspect of the concept. However, it may be added here that the aforementioned knob 34 is preferably made from wood or some equivalent heat resisting insulation material, and may be glued or otherwise secured in place.

In FIGURE 1 the clip is shown as attached to the rim or wall portion 38 of a skillet or the like 40. It will be evident that it was thought unnecessary here to illustrate other utensils such as pots, pans and the like inasmuch as there are numerous types and styles in use. In FIGS. 3 and 4 the support and holder means or clip proper 10 is shown in the manner used for supporting and anchoring a lid or cover 42. With respect to FIGURE 4 the function of the lug or detent 24 is emphasized. As already suggested the illustration in FIGURE 5 is here employed to show the manner in which the upper edge portion 20 is employed for breaking an egg. In this connection it will be evident that the orifice or drainage port 22 allows the white of the egg to be guided down into the receptacle portion of the pan and to escape by way of the drainage port 22. This port also serves to permit grease and drippings, when various utensils are held, to be retrieved in the receptacle portion of the pan. In FIG. 6 the clip is shown supporting a pancake turner or the like 44. In FIGURE 7 a knife 46 is shown held in the clip portion 10 with the tip of the blade of the knife additionally anchored and held in that it is allowed to pass through the port 22. When, as shown in FIG. 4 the upper edge of the rim or wall has an outstanding encircling bead 48 the curvature of the bend forming the hook-shaped body portion 28 serves to clear the bead and to facilitate applying and removing the clip.

It is believed that a careful consideration of the description in conjunction with the views of the drawings will enable the reader to obtain a clear and comprehensive understanding of the subject matter of the invention as well as the features and advantages, mode of use and improved results attained. Therefore, a more extended description is regarded as unecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A multipurpose clip for attachment to a wall of kitchen utensils such as pots, pans, skillets and the like comprising: a support and holder for lids and implements such as forks, spoons, knives, food turners and the like, said holder being substantially V-shaped in edge elevation and embodying inner and outer upwardly diverging permanently spaced legs having a V-shaped crotch therebetween, the outer leg adapted to contact and reside firmly against the inner surface of the utensil wall, the inner leg having an accessible upper edge wholly exposed and capable of use as an egg breaker, the upper end of the outer leg having a resilient self-retained clasp adapted to releasably hook over the upper edge of said wall and bear against the outer surface of the utensil wall.

2. The structure defined in claim 1, and wherein said clasp comprises a hook the lower free end of which is convexly rounded and joined with an outstanding flange, and a finger-gripping knob mounted atop a median portion of said flange.

3. The clip according to claim 1, and wherein the junctional bight portion connecting the lower ends of said legs is rounded and provided with an orifice defining a drainage port.

4. The structure defined in claim 3, and wherein a median portion of said outer leg is provided with an inwardly directed lug, the latter projecting into the space between said legs and terminating short of and spaced from the interior surface of said inner leg and providing a detent.

5. A multipurpose clip designed and adapted to be removably mounted on an upper edge portion of the wall of a kitchen utensil comprising: a one-piece sheet material clip embodying an implement support and holder substantially V-shaped in edge elevation and embodying inner and outer upwardly diverging legs spaced apart and providing a V-shaped crotch therebetween, the outer leg adapted to contact the inner surface of the utensil wall, the inner leg having an upper edge projecting above the upper end of the outer leg and spaced therefrom and freely available for use as an egg breaker, the bight portion which joins the lower ends of said legs having a drainage port therein, the upper end of the outer leg having a self-retained resilient clasp which can be releasably hooked over the upper edge of said wall in a manner to bear against the outer surface of the wall, said clasp comprising a hook the lower free end of which is convexly rounded and joined with an outstanding flange, and a finger-gripping knob mounted atop said flange.

6. The structure defined in claim 5, and wherein a median portion of said outer leg is provided with a struck out tongue providing an inwardly directed lug, the latter projecting into the space between said legs and terminating short of the inner leg and constituting a detent.

References Cited in the file of this patent

UNITED STATES PATENTS

| | | |
|---|---|---|
| 670,502 | Anderson | Mar. 26, 1901 |
| 1,468,256 | Blackman et al. | Sept. 18, 1923 |
| 1,601,572 | Lester | Sept. 28, 1926 |
| 1,752,522 | Eckelman | Apr. 1, 1930 |

CLAUDE A. Le ROY, *Primary Examiner.*